March 21, 1939.  H. E. MUCHNIC  2,150,896
TRUCK CENTER BEARING
Filed July 3, 1936　2 Sheets-Sheet 1
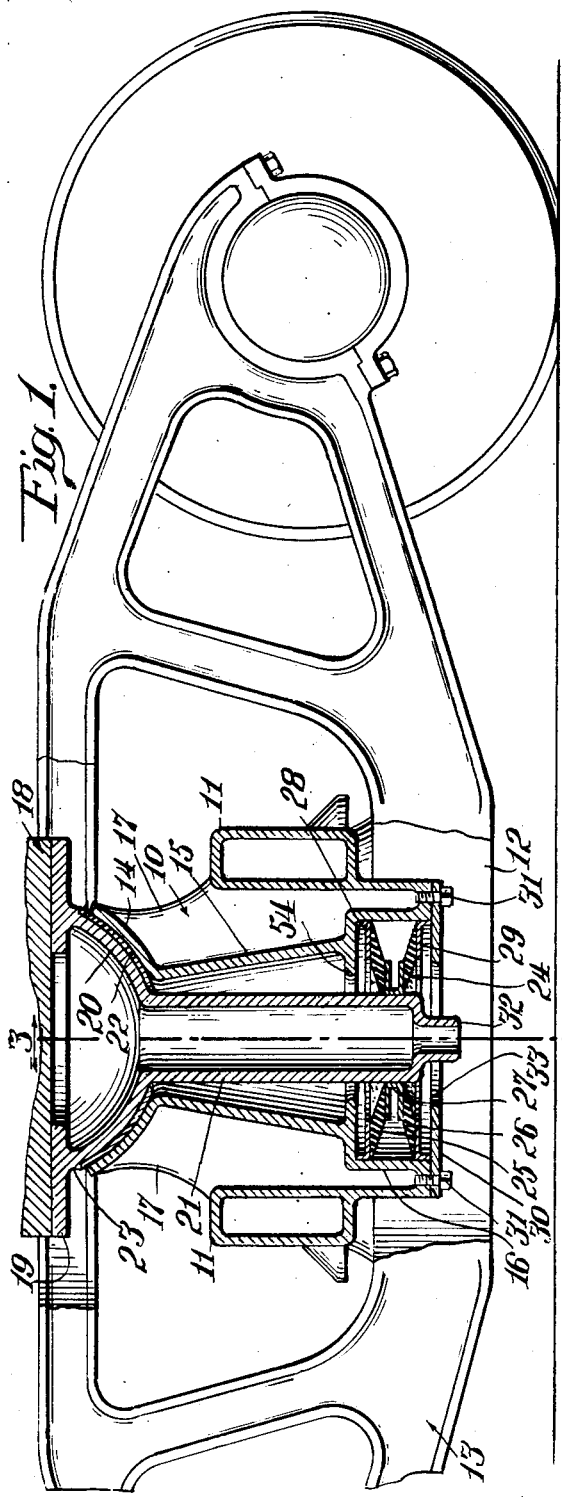
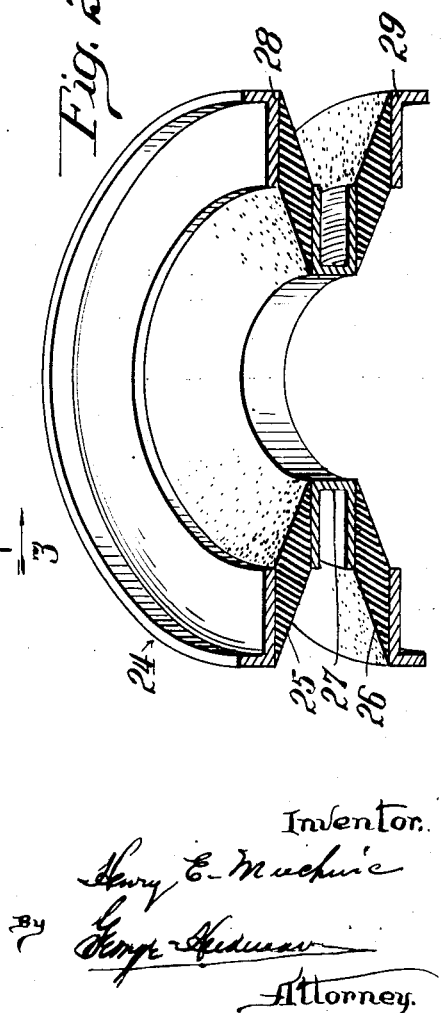
Inventor.
Henry E. Muchnic
By George Anderman
Attorney.

March 21, 1939. H. E. MUCHNIC 2,150,896
TRUCK CENTER BEARING
Filed July 3, 1936 2 Sheets-Sheet 2
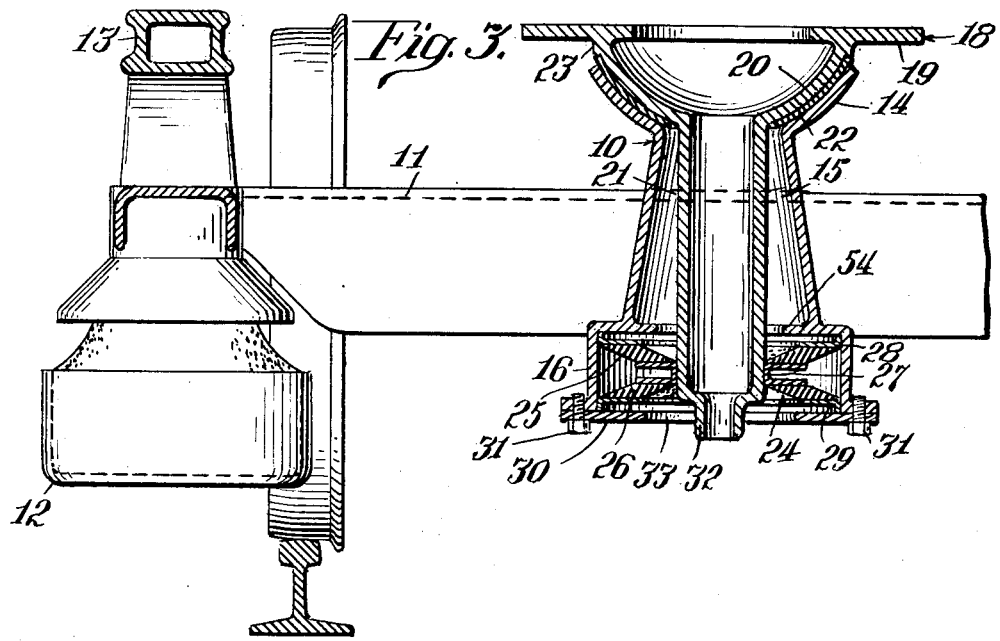
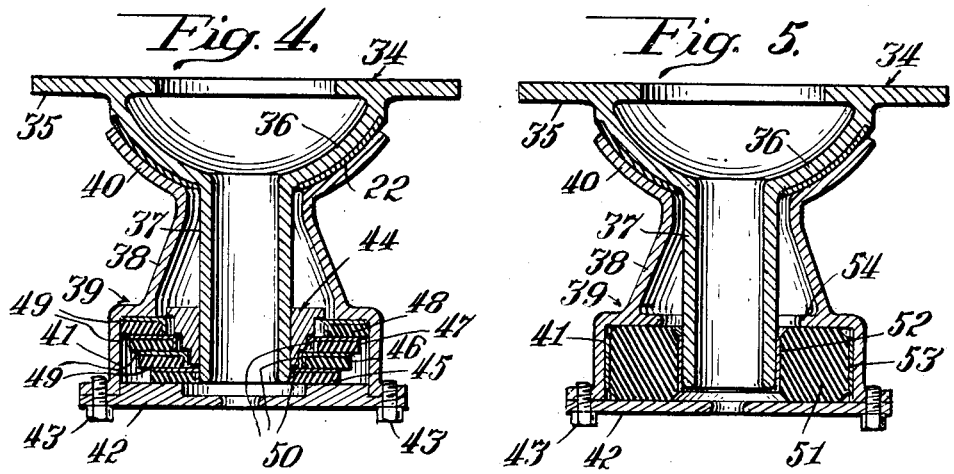
Inventor
Henry E. Muchnic,
By George Heidman
Attorney Patented Mar. 21, 1939

2,150,896

UNITED STATES PATENT OFFICE

2,150,896

TRUCK CENTER BEARING

Henry E. Muchnic, Atchison, Kans., assignor to The Locomotive Finished Material Company, Atchison, Kans., a corporation of Kansas Application July 3, 1936, Serial No. 88,776

9 Claims. (Cl. 105—199)

My invention relates to center bearings more especially intended for railroad passenger cars provided with trucks having restrained lateral motion as distinguished from the type having more or less freedom up to a predetermined limit; the invention involving a center bearing of what may be called a king pin type.

The invention has for its object the provision of bearing means intermediate of the car body and the truck for stabilizing the car body while providing universal motion between the truck and car body which permits the latter to rock, relative to the truck, in any direction and the car body or truck to assume any position within prescribed limits; said means being adapted to restrain excessive relative movements and to restore the normal relation between the car body and truck when the car is again traveling on a straight or tangent track.

The invention also has for its object the provision of a bearing construction or means in which a constant maximum contact relation between the car member and the truck member of the bearing exists with the result that the slapping action encountered with the type of center bearings at present in use will be eliminated.

The invention contemplates restraining means operatively intermediate of the car body member or element and the truck member or element whereby impacts between the car body and truck will be impossible and the resultant dynamic blows as heretofore encountered will be eliminated; said means yieldingly restraining the oscillatory movements of the car body and truck with the result that the need for the usual side bearings between the car body and truck is obviated and a more or less floating action, as it were, provided.

The above enumerated objects and advantages, as well as other advantages inherent in the construction, will all be more readily comprehended from the following detailed description of the drawings, wherein:

Figure 1 is a side elevation of a part of a truck with the intermediate portion of the side frame and other elements of the truck broken away to disclose the center car bearing portion which is shown in vertical section.

Figure 2 is a detail perspective view of a segment of the resilient cushion or restraining means adapted to be operatively arranged intermediate of the car and the truck members of the bearing.

Figure 3 is a vertical sectional view taken on the line 3—3 of Figure 1 looking in the direction of the arrows.

Figure 4 is a vertical sectional view of a modified form of the bearing;

Figure 5 is a similar view of another modification of the bearing.

My invention as exemplified in the drawings is especially intended for use on a railroad passenger car truck of the type having restrained lateral motion as for example disclosed in my pending truck application, Serial Number 81,876, as differentiated from the type wherein the respective elements are so arranged that sudden blows or impacts are encountered between truck and car body.

The specific embodiment of the invention, as disclosed in Figures 1 to 3, involves a center bearing composed of a female or truck member 10 shown secured to or formed integral with the transversely disposed transom members 11, 11 which may constitute a continuous structure disposed from side to side of the truck and yieldingly supported at the ends on the tension or bottom member 12 of the truck side frame 13.

The truck member 10 comprises the upper substantially semi-spherical cup portion 14, with a downwardly disposed and flaring hollow stem portion 15 of predetermined length and shown preferably terminating at bottom in the inverted cup portion or chamber forming wall 16 which is shown integrally united with the lower side of the transom members 11, 11. The upper substantially semi-spherical cup portion 14 and the lower inverted cup portion 16 are preferably reenforced by the radial webs 17 extending from top to bottom as shown in Figure 1 and which are preferably also formed integral with the transom portions 11, 11.

The bearing involves the male or car member 18 comprising the upper annular flat flange or ring portion 19 adapted to be secured to the car body and shown formed integral with a substantially semi-spherical ball portion 20 which is adapted to fit into the semi-spherical cup portion 14 of the truck member and permit oscillatory movement in any direction between the car member and the truck member.

The semi-spherical portion 20 is provided centrally with the depending stem or king pin portion 21 of predetermined length and adapted to extend through the flaring stem portion 15 of the truck member 10. The semi-spherical portion 20 is preferably provided with a substantially semi-spherical bronze bushing or bearing element as shown at 22 in Figure 1 arranged in contact with the wall of the cup portion 15 of the truck member 10.

The bushing 22 is apertured for passage of the stem or king pin portion 21 therethrough and the arcuate wall of the car member adjacent the annular ring portion 19 is preferably shouldered as shown at 23 to provide a holding relation between the bushing and the car member 18.

With my improved bearing construction, it is apparent that the truck may assume any position in a horizontal plane relative to the car body, or vice versa, and that the operative relation between the car body and truck will be maintained by the depending stem or king pin portion 21.

In order to prevent undesirable and unrestricted excessive movement and to stabilize the car body, I provide the resilient restraining means indicated at 24 arranged in the inverted cup portion 16 of the truck member 10. The restraining means is circumferentially disposed about the depending stem or king pin portion 21 so as to yieldingly restrain the oscillatory movements of the king pin portion and hence restrain the independent relative movement of the car body and truck.

This resilient restraining or cushion means 24 in the specific exemplification of the invention disclosed in the first three figures contemplates the annular mass or blocks of rubber 25, 26 of diamond shape cross section and slopingly arranged so that the lower side of the block 25 will define the arc of a smaller circle than that defined by the upper side of the block of rubber 25; while the upper side of the block 26 will define the arc of a smaller circle than that defined by the lower side of the block 26.

The lower side of arcuate block 25 and the upper side of the arcuate block 26 are each vulcanized or firmly secured to the horizontally disposed side walls of a metallic channel member 27 which is also of circular or semi-circular formation. The base portion of the channel member constitutes the inner perimeter of the cushion means and is intended to surround and to contact with the depending stem 21 of the car member 18. That is to say, the base portion of the channel member 27 is intended to define a circle of size just sufficient to receive the depending stem 21 and maintain firm contact therewith. The opposite or outer perimeters of the blocks of rubber 25 and 26 are each preferably vulcanized to one side of the annular members or rings 28 and 29, respectively. The two members are shown of angle formation in cross section, see Figure 2, with one side or flange extending vertically at the outer perimeter of the cushion the outer flanges of the rings 28 and 29 being disposed in opposite directions, namely upwardly and downwardly, so as to form contact with the annular wall of the inverted cup portion 16 of the truck member 10.

The resilient or cushion means 24 may either be of continuous or segmental formation, with the segments preferably in abutting relation with each other to provide a continuous annular member or restraining ring about the pin 21. The cushion means may be held in place in the chamber or inverted cup portion 16 in any suitable manner as for example by the bottom plate 30 which is secured in place by suitable bolts as at 31 in Figures 1 and 3.

With the cushion means or blocks of rubber 25, 26 formed and arranged as shown and described, it is apparent that the blocks of rubber will be in shear during any oscillatory movement of the car body or of the truck and considerable oscillatory latitude permitted. In assembly, the cushion means is preferably of such diameter relative to the diameter of the chamber or inverted cup 16 that the rubber will constantly be under slight compression and excessive oscillatory movements between the car body member and truck member of the bearing will be yieldingly restrained; the compressed or distorted condition of the resilient rubber mass tending to return the bearing elements to normal position after the truck again reaches a normal straight or tangent track. With the cushion means shown and described, a stabilizing bearing or effect between the car body and truck is provided and excessive movements are yieldingly restrained, with the result that the forceful impacts or slaps as heretofore encountered between the car body and the truck will be prevented.

The depending stem or king pin portion 21 in Figures 1 and 3 at its lower end is preferably shown somewhat reduced at 32 and arranged to extend through an opening 33 in the bottom plate 30 to permit attachment of suitable recoil or rebound absorbing means if desired. When the stem 21 is extended through the plate, the hole or opening 33 in the bottom plate 30 must be of sufficient size to provide sufficient freedom for the pin and permit the oscillatory movement intended by the bearing structure.

In Figure 4 I show a modification of the bearing which consists of the car member 34 provided with the annular flat flange portion or ring 35 whereby the member may be secured to the bottom of the car body; the flange being arranged about the upper perimeter of the substantially semi-spherical wall or ball portion 36 which terminates centrally in the depending stem or king pin portion 37. The pin 37 is of predetermined length and diameter and arranged to extend through the truncated conical portion or hollow stem 38 of the truck member 39 of the bearing. The truck member 39, at the upper end of the hollow stem 38, is provided with a substantially semi-spherical cup portion 40 adapted to receive the arcuate or ball portion 36 and the substantially semi-spherical bushing 22 as in the structure shown in Figures 1 and 3. The lower end of the stem portion 38 terminates in an inverted cup portion or annular chamber 41 which is formed to receive the cushion means and the cushion means held in the inverted cup member by a suitable bottom plate 42 shown secured in place by bolts 43. The bearing in this construction involves a stepped collar 44 intimately secured about the lower end of the depending stem or king pin portion 37 and this collar 44 is surrounded by an oppositely staggered or stepped composite resilient element consisting of a plurality of rubber discs 45, 46, 47 and 48 of increasing circumference or size.

Each of these rubber discs is preferably secured or cemented to the lower side of a metallic disc provided with an annular flange as at 50 at the inner circumference thereof where contact with the stepped collar 44 may be encountered.

The respective rubber discs and their metallic shields or coverings are so formed that the lower disc 45 with the inner flange 50 of its metallic disc 49 is constantly in contact with the lower end of the depending stem or king pin portion 37 of the car member of the bearing; while the superposed and somewhat larger disc 46 is normally in slight spaced relation with the first shoulder or step of collar 44; the next superposed and still larger disc 47 normally being in somewhat greater spaced relation with the adjacent shoulder or step of collar 44; while the largest or uppermost disc 48 normally will be in greatest spaced relation with the adjacent shoulder or step of the collar 44; while the uppermost step or shoulder of collar 44 is normally disposed in a plane above that of the upper rubber disc 48. With this structure it is apparent that the cushion means will be placed in shear during the oscillatory movements of the elements of the bearing and hence of the car or truck relative to each other.

In Figure 5 the car member 34 and the truck member 39 are like the car member and the truck member shown in Figure 4; the car member being shown with the arcuate or substantially semi-spherical portion 36 and with the depending pin portion 37 which extends into the chamber formed at the bottom of the truck member by the annular wall 41; the throat or upper end of the flared hollow stem 38 of the truck member being formed to permit oscillatory movement of the pin 37 of the car member.

In the construction shown in Figure 5, I disclose a modification of the cushion means which in this instance consists of an annular mass or solid block of rubber 51 of dimensions sufficient to practically fill the chamber. The friction encountering sides of this annular block, namely the inner and the outer perimeters, are preferably provided with thin steel sleeves as at 52, 53. In practice, the rubber cushion is of such size that it normally will be under slight compression and hence the inner sleeve 52 will be in constant contact with the pin 37 while the outer sleeve 53 will be in constant contact with the wall 41 of the chamber; the rubber cushion offering a yielding resistance to the relative oscillations between pin 37 and the truck member and hence will cushion the swinging movements between the car body and the truck.

With my improved center bearing the truck can assume any position relative to the car body, or vice versa, around a fixed center; the movements all being yieldingly restrained and a stabilizing action provided.

Excessive movement between the members is limited by the flanges 54 arranged adjacent the top of the cushion means receiving chamber in the structures disclosed in Figures 1, 3 and 5, while in Figure 4 this is accomplished by the predetermined clearance between the enlarged end of the stepped collar 44 and the top wall of the housing or chamber.

My improved bearing provides for constant contact to be maintained between the car member and the truck member and the possibility of impact or slap between the car body and truck eliminated; the cushion means tending to return the car body or truck to normal position after the truck again reaches a straight or tangent track.

With my improved bearing the need for the usual side bearings as at present employed is eliminated and the car provided with a smoother or floating action as it were. The bearing may be provided with any of the conventional grease ways or ducts for introducing lubricant between the spherical seating portions of the bearing; and while I have disclosed what I believe to be practical embodiments, the invention may have expression in somewhat different form without departing from the spirit of my invention.

What I claim is:

1. A center bearing of the character described comprising a car member and a truck member having a ball-and-socket bearing relation with each other adapted to permit relative oscillatory movement, said members being provided with depending telescoping portions, and resilient means between said portions whereby limited oscillatory movement is provided.

2. A center bearing of the character described comprising a car member and a truck member arranged in telescopic relation with the upper ends of the members formed to provide ball-and-socket bearing relation between the members adapted to permit oscillatory movement, said members being provided with depending stem portions, and resilient means between the depending stem portions of the two members for yieldingly restraining the oscillatory movements between the car member and the truck member.

3. A center bearing of the character described comprising a car member provided with a semi-spherical portion and a central depending pin portion; a truck member provided with a semi-spherical socket adapted to receive and support the semi-spherical portion of the car member and having a depending tubular portion adapted to receive said pin portion and allow oscillatory movement of the latter; and cushion means intermediate of the pin portion and the tubular portion for yieldingly restraining the relative oscillatory movements of the members.

4. A center bearing of the character described comprising a car member having a semi-spherical portion and a depending king pin portion; a truck member having a semi-spherical socket in which the semi-spherical portion of the car member is seated and a flared tubular portion to receive the king pin portion of the car member; and cushion means arranged within the tubular portion and circumferentially about the king pin portion for yieldingly restraining the relative oscillatory movements of the two members and to cause the members to return to normal positions.

5. A center bearing of the character described comprising a car member provided with a semi-spherical portion and a depending king pin portion; a truck member provided with a socket portion adapted to seat the semi-spherical portion of the car member and having a depending flared hollow stem adapted to receive the king pin portion and permit oscillatory movement of the latter, said hollow stem terminating at bottom in an annular chamber; and cushion means arranged in said annular chamber about the king pin portion and involving rubber in resistance.

6. A center bearing of the character described comprising a car member involving a ball element and a truck member involving a socket element, the one seated within the other, the car member having a depending king pin portion, while the truck member at its lower end is operatively connected with a truck element and is provided with an enlarged chamber into which said king pin portion extends; and cushion means arranged in said chamber about the king pin portion and adapted to yieldingly restrain the oscillatory movements between the members, said cushion means involving rubber in resistance.

7. A center bearing of the character described comprising a car member and a truck member having ball-and-socket bearing relation with each other, the car member having a depending king pin portion, while the truck member at bottom has an enlarged chamber into which the king pin portion extends and is permitted lateral oscillatory movement; and cushion means arranged in said chamber about the king pin portion and involving an encircling rubber mass and non-yielding means, said mass and means being provided with successively contacting surfaces whereby a progressively increasing resistance to independent movement between the truck member and car member is provided.

8. A center bearing of the character described comprising a car member and a truck member provided at top with ball-and-socket seating portions, the car member having a depending king pin portion, while the truck member at the bottom has an enlarged chamber into which the king pin portion extends and is permitted lateral oscillatory movement; and cushion means arranged in said chamber about the king pin portion and involving a plurality of superposed rubber discs of gradually increasing diameter from bottom to top and disposed about the king pin portion in said enlarged chamber, and annular means arranged in said chamber provided with a stepped surface corresponding with the thickness of the rubber discs and adapted to progressively contact with the rubber discs to thereby increase the resistance to independent oscillatory movement between the truck member and car member.

9. A center bearing of the character described comprising a car member and a truck member formed to provide ball-and-socket bearing relation with each other adapted to permit oscillatory movement of the car or the truck, the car member having a king pin portion depending below said ball-and-socket bearing while the truck member has an encircling chamber for the lower end of the pin portion of the car member formed to permit lateral oscillatory movement of the pin portion; cushion means arranged in said chamber about the lower end of the pin portion in increasing distance therefrom; and stepped means in said chamber adapted to successively engage said cushion means and thereby progressively increase the resistance to the relative oscillatory movements between the car member and the truck member.

HENRY E. MUCHNIC.